(12) United States Patent
Ehrman et al.

(10) Patent No.: US 7,971,835 B2
(45) Date of Patent: Jul. 5, 2011

(54) ADJUSTABLE CABLE-CONCEALING UNIVERSAL MOUNTS

(75) Inventors: Michael L. Ehrman, New York, NY (US); Vladimir Yakhnich, Westwood, NJ (US)

(73) Assignee: I.D. Systems, Inc., Woodcliff Lake, NJ (US)

( * ) Notice: Subject to any disclaimer, the term of this patent is extended or adjusted under 35 U.S.C. 154(b) by 2 days.

(21) Appl. No.: 12/368,773

(22) Filed: Feb. 10, 2009

(65) Prior Publication Data

US 2010/0200719 A1 Aug. 12, 2010

(51) Int. Cl.
*A47F 5/00* (2006.01)
*A47F 7/00* (2006.01)
*F16M 11/00* (2006.01)
*F16M 13/00* (2006.01)

(52) U.S. Cl. ............... 248/125.7; 248/122.1; 248/309.1

(58) Field of Classification Search .............. 248/122.1, 248/125.7, 125.9, 126, 276.1, 917, 49, 309.1, 248/160, 125.3

See application file for complete search history.

(56) References Cited

U.S. PATENT DOCUMENTS

| 2,290,410 | A | * | 7/1942 | Dawson | 248/125.3 |
| 5,810,307 | A | * | 9/1998 | Odum | 248/278.1 |
| 7,389,965 | B2 | * | 6/2008 | Oddsen et al. | 248/274.1 |
| 2007/0040084 | A1 | * | 2/2007 | Sturman et al. | 248/280.11 |

* cited by examiner

*Primary Examiner* — Amy J Sterling
(74) *Attorney, Agent, or Firm* — Troutman Sanders LLP; James E. Schutz; Robert R. Elliot, Jr.

(57) ABSTRACT

A mounting apparatus for mounting a device, preferably to a surface of a vehicle. In an exemplary embodiment, the mounting apparatus may comprise a base, a first intermediate component, a second intermediate component, and an adapter. The first intermediate component may be engageable to the base in at least two positions relative to the base. The second intermediate component may be engageable to the first intermediate component in at least two positions relative to the first intermediate component. The adapter may be engageable to the second intermediate component in at least two positions relative to the second intermediate component. The adapter may also be engageable to the device. The first intermediate component, the second intermediate component, and the adapter may be adjustable to position the device in a plurality of predetermined positions relative to the base, and may also be configured to receive a wire.

11 Claims, 9 Drawing Sheets

ADJUSTABLE CABLE-CONCEALING UNIVERSAL MOUNTS

BACKGROUND

1. Technical Field of the Invention

The present invention relates generally to mounting apparatuses and, more particularly, to universal mounts that conceal wiring.

2. Description of Related Art

There is a need in the art to mount wired devices or objects so that the devices or objects can be manipulated and adjusted, yet maintain ruggedness and tamper-resistance. Such mounts would be particularly useful in vehicles because a vehicle operator often desires to access controls while operating a vehicle. For example, a utility vehicle may include a mount for a user interface, or vehicle-mounted computer ("VC"), allowing the user to operate vehicle functions from the user's seat. A number of mounts have been developed thus far, but none are ideal for practical and efficient use in a vehicle.

Swivel mounts, which are often pole or panel mounted, are sometimes used to support electrical devices at a desired position. Some swivel mounts operate by means of adjustable gearing that allow a device to be moved and positioned as desired within a certain range. Others operate by means of friction between different surfaces. In any event, once the device is properly positioned, the swivel mount provides support to maintain the device in place.

Over time, due possibly to heat generated by a mounted electrical device, a swivel mount may lose its ability to maintain the desired position against such external forces as gravity, weather, and environmental changes. Thus, the device may begin to droop, thereby requiring frequent readjustment. One solution to this problem is to incorporate a bolt, nut, clamp, or other tightening element to increase the frictional forces or the gearing inter-engagement of the swivel mount.

As an alternative approach, two axes of movement can be incorporated into a swivel mount. Thus, two such screws, nuts, clamps, or other tightening elements would require manipulation during adjustment of the mount. Operators may tighten one screw element with respect to one axis before positioning the device with respect to the other axis. If further refinement of the mount is required, the first element may then have to be readjusted, which sometimes necessitates readjustment of the second element. Extensive time and energy may be required to satisfactorily adjust such a mount.

Ball and socket mounts reduce effort required of the operator since only one tightening element need be addressed rather than the two generally required with gear-enabled swivel mounts. But ball and socket mounts may show wear and tear more quickly than other types of mounts, because with a ball and socket mount, the user can forcibly push the ball pass its natural stopping point in order to reach a more desirable mount position.

Regardless of the type of mount utilized, the wiring for the device has to be strung somewhere, whether that be through the mount or outside of the mount. If the wires are run within or through the swivel mount, then the wiring often has to extend around internal obstacles, increasing the chance that wires will be bent or kinked, resulting in electrical hazards. In the case of a ball and socket mount, wires cannot be threaded through the mount, or they will be pinched by the ball movement, possibly resulting in dangerous exposed wiring. Alternatively, if wiring is run external to the mount to avoid such obstacles, then the exposed wiring is subject to all the elements and dangers associated with external wiring, including human tampering with the wires.

Further, wiring extending through or along the swivel mount often limits the range of movement permitted by the mount. Each device comes with a certain amount of wiring, predetermined by the manufacturer. If a device's wires are too short, wrapping them around the mount or threading them through the mount may cause the adjustability of the mount to be limited by such short wires.

Therefore, there is a need in the art for a universal adjustable mount capable of practically concealing wires. It is to such a mount that the present invention is directed.

SUMMARY

Briefly described, in exemplary form, the present invention relates to an adjustable universal mount capable of concealing wiring and a method for manufacturing such a mount. For instance, an exemplary embodiment of the present invention relates to a mount for a VC, where the mount is adjustable so that the face of the VC may be directed in a variety of predetermined angles and where the mount conceals the wiring of the VC.

In one aspect of an exemplary embodiment, the mount may comprise a base, a first intermediate component, a second intermediate component, and a swivel adapter. The base may be securable to a surface. The first intermediate component may comprise an extension arm. The second intermediate component may comprise a collar member engageable to the extension arm. One or more components of the mount may be adjustable relative to one another, and, preferably, adjustment does not require use of an external tool. Further, one or more components may be configured to receive or conceal a wire.

The extension arm may have a first plurality of extension arm interface elements, which may be complimentary to a first plurality of collar member interface elements. One or more of the first plurality of extension arm interface elements may be engageable to one or more of the first plurality of collar member interface elements. The collar member may be adapted to rotate and to be fixed in a plurality of predetermined positions relative to the extension arm.

A second plurality of collar member interface elements may be complimentary to a first plurality of swivel adapter interface elements. One or more of the second plurality of collar member interface elements may be engageable to one or more of the first plurality of swivel adapter interface elements. The swivel adapter may be adapted to pivot, preferably about a single axis of rotation, and to be fixed in a plurality of predetermined positions relative to the collar member. Taken together, the extension arm, the collar member, and the swivel adapter may be adjustable to point the device in a plurality of predetermined directions relative to the interface assembly. Preferably, the mount may be adjusted so that a device supported by the mount may be positioned to face in any of a variety of predetermined directions relative to the interface assembly.

Additionally, the swivel adapter may be adapted for engagement with the device. The device may attach directly to the swivel adapter, or it may attach to some other part or combination of parts, which parts attach to the swivel adapter, so that the swivel adapter carries the device.

One or more elements of the mount, including the extension arm, collar member, and swivel adapter, may be adapted to receive a wire. These elements are preferably hollow, or comprise apertures or cavities, to allow wiring of the mounted device to be threaded through the mount and, thereby, concealed.

The mount may further comprise an interface assembly, a locking mechanism, or both. The interface assembly may be capable of being attached to a surface, preferably a surface at any angle. The interface assembly may also be adapted to receive a wire, and may contain an aperture for that purpose. The locking mechanism may secure the extension arm, the collar member, and the swivel adapter. Engagement of the locking mechanism may restrict movement of the extension arm, the collar member, and the swivel adapter relative to one another. When the locking mechanism is disengaged, these elements may be moved in relation to one another, thereby allowing a user to adjust the mount. The locking mechanism may utilize a spring, such that compressing the spring disengages the locking mechanism.

These and other objects, features and advantages of the present invention will become more apparent upon reading the following specification in conjunction with the accompanying drawing figures.

DETAILED DESCRIPTION

To facilitate an understanding of the principles and features of the present invention, it is explained hereinafter with reference to its implementation in an illustrative embodiment. In particular, the invention is described in the context of a cable-concealing adjustable mount for use in a vehicle. The invention is also described in the context of a method for manufacturing such a mount. The invention, however, is not limited to its use in a vehicle. Rather, exemplary embodiments of the present invention may be used whenever or wherever a mount is desired or necessary.

Materials described hereinafter as making up various elements of the invention are intended to be illustrative and not restrictive. Many suitable materials that would perform the same or similar functions as the materials described herein are intended to be embraced within the scope of the invention. Such other materials not described herein may include, but are not limited to, for example, materials that are developed after the time of the development of the invention.

Referring now to the figures, wherein like reference numerals represent like parts throughout the views, exemplary embodiments of the present invention will be described in detail.

Figure 1A:
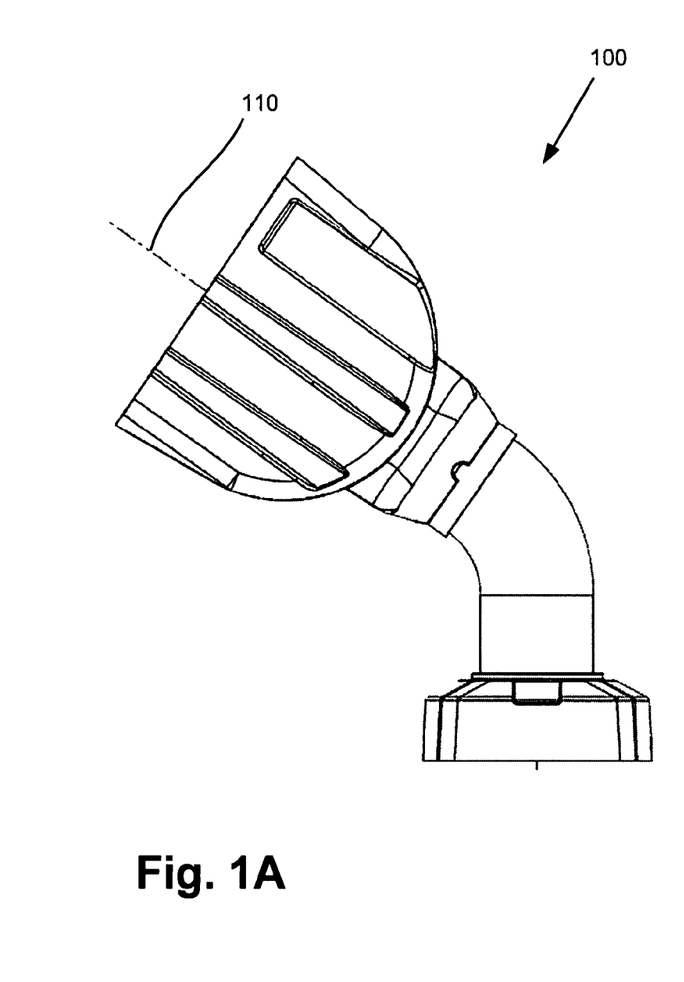
FIG. 1A illustrates a side view of a mount in accordance with an exemplary embodiment of the present invention.
Figure 1B:
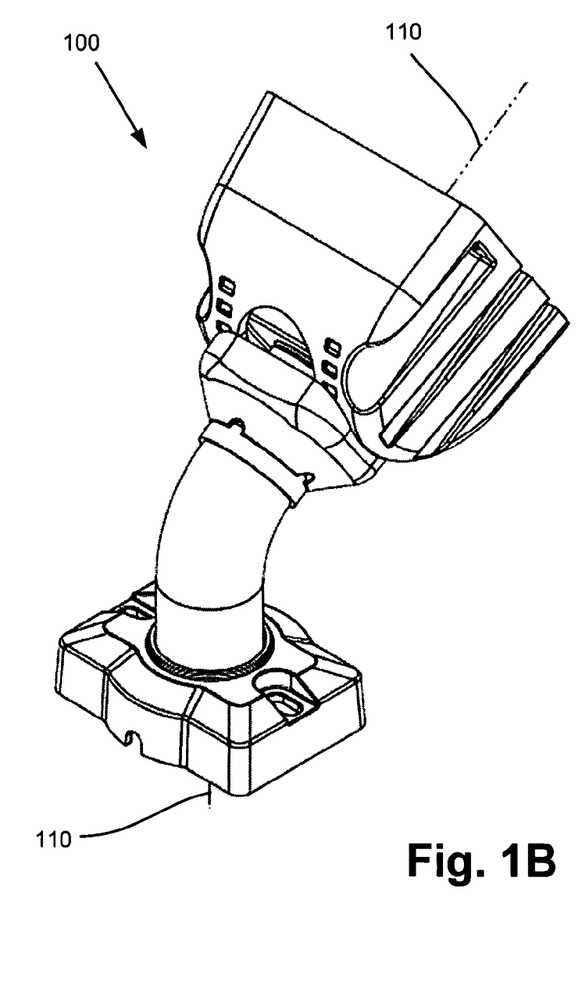
FIG. 1B illustrates a perspective view of the mount in accordance with an exemplary embodiment of the present invention.

FIGS. 1A-1B illustrate, respectively, side and perspective views of a mount 100 according to an exemplary embodiment of the present invention. The mount 100 is, preferably, rugged and may be designed for high vibration and high shock environments. For example, elements of the mount 100 may be constructed of, or lined with plastic or rubber. As shown, a device cable 110 can extend through the length of the mount 100.

Figure 2A:
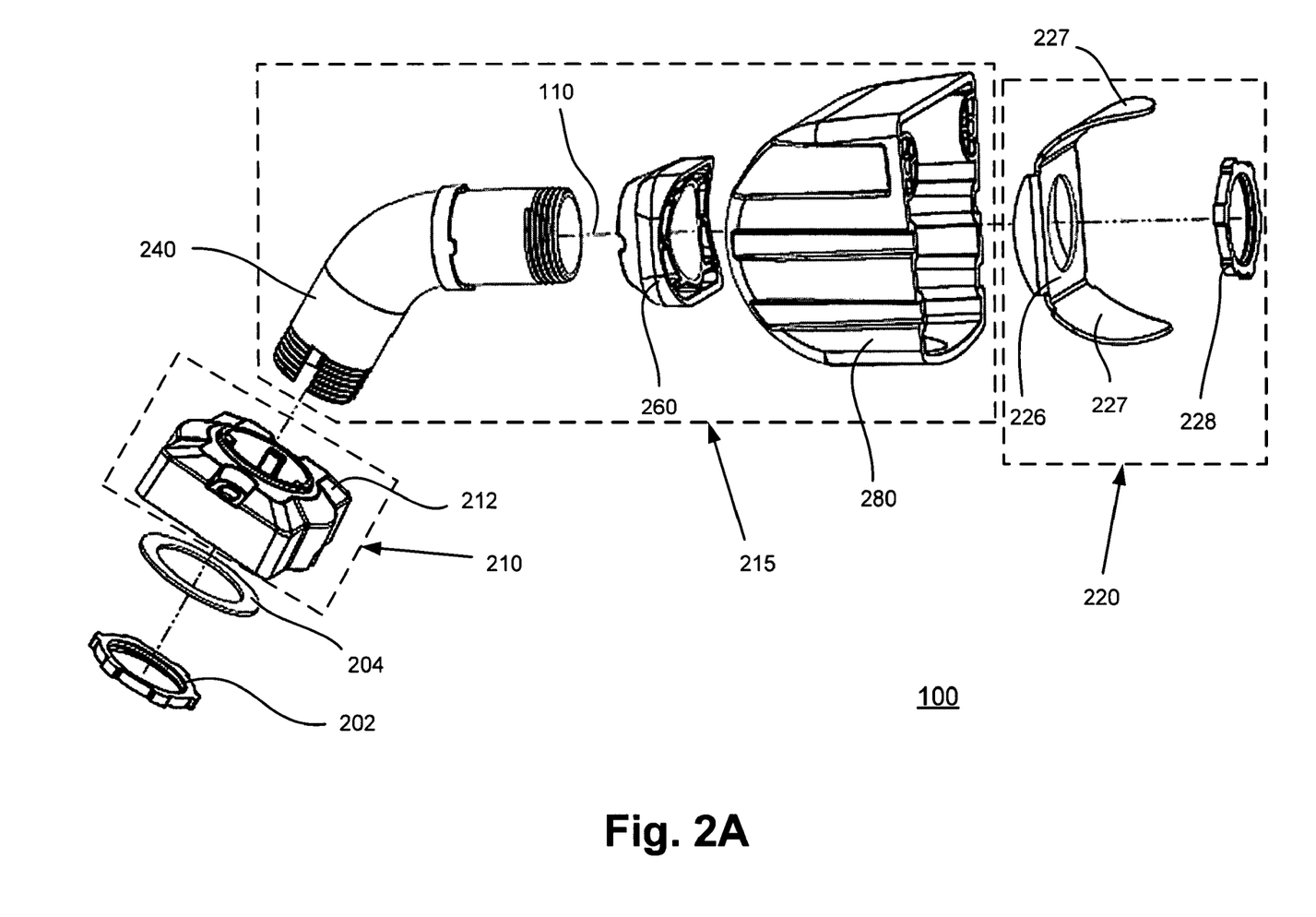
FIGS. 2A-2B illustrate exploded perspective views of the mount in accordance with an exemplary embodiment of the present invention.
Figure 2B:
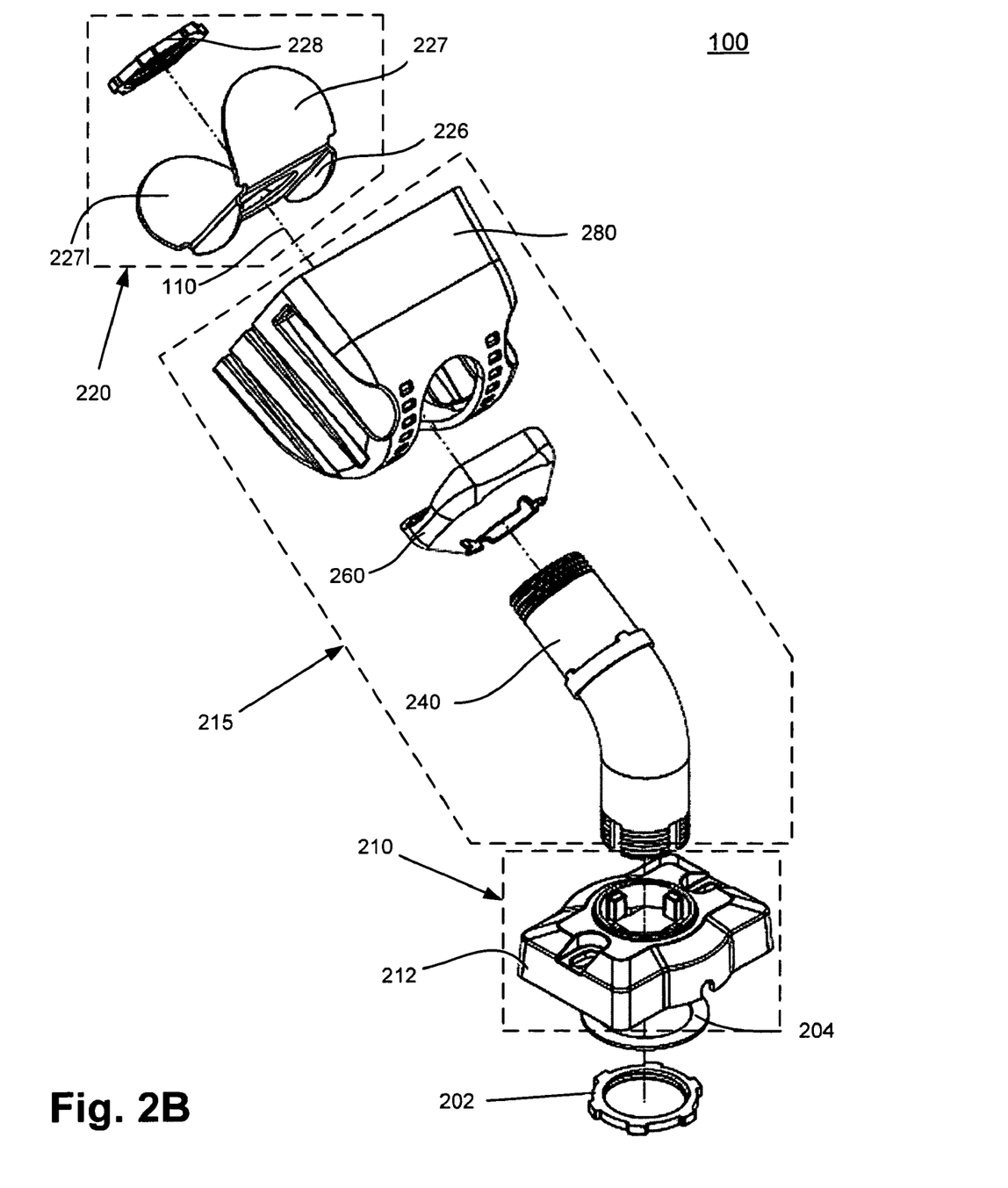

FIG. 2A and FIG. 2B illustrate exploded perspective views of the mount 100 depicted in FIG. 1. In this exemplary embodiment, the mount 100 comprises an interface assembly 210, an adjustment assembly 215, and a locking mechanism 220.

The interface assembly 210, or vehicle interface assembly, may be used to attach the mount 100 to a surface or structure of a vehicle or to some other structure. In this exemplary embodiment, the interface assembly 210 is a base 212, but other or additional elements may be used in the interface assembly 210. The base 212 may be an interface between the adjustment assembly 215 and a surface. Preferably, the base 212 may attach to a surface tilted at an angle.

The adjustment assembly 215, or concealing assembly, may provide means for an operator of the mount 100 to adjust the mount 100 so that a mounted device is placed and angled for optimal viewing. In an exemplary embodiment of the present invention, the mount 100 may be adjustable to accommodate installation angles for numerous types of vehicles. Additionally, the mount 100 may provide for full, spherical angular flexibility with respect to placement of a mounted device. The adjustment assembly 215 may comprise multiple interconnectable parts that are flexible relative to the base 212 and to one another in certain situations, thereby allowing the mount 100 to be adjusted. The adjustment assembly 215 may comprise, but is not limited to, a rigid hose, pipe, or extension arm 240; a collar member 260; and a swivel adapter 280. Preferably, elements of the adjustment assembly 215 are hollow or comprise apertures, allowing device wiring 110 to be partially or completely enclosed within, and therefore concealed by, such elements. Such elements may preferably be adjusted in such a way as to allow the mounted device to face in any of a plurality of predetermined directions, and to direct the device towards the face of a human operator of any size. A first nut 202 and a first anchoring member 204 may secure the adjustment assembly 215 to the interface assembly 110.

When engaged, the locking mechanism 220 may disables adjustment of the mount 100. Elements of the locking mechanism 220 may be located in various positions. For example, locking elements may be located on either or both ends of the mount 100, may be located anywhere on the mount 100, or may be interspersed throughout other elements of the mount 100. The locking mechanism may comprise, but is not limited to, a second anchoring member 226 with wings 227, and a second nut 228.

Preferably a device wire or cable 110 may be threaded through the hollows of the mount 100 to keep the cable 110 concealed and removed from tampering.

Figure 3A:
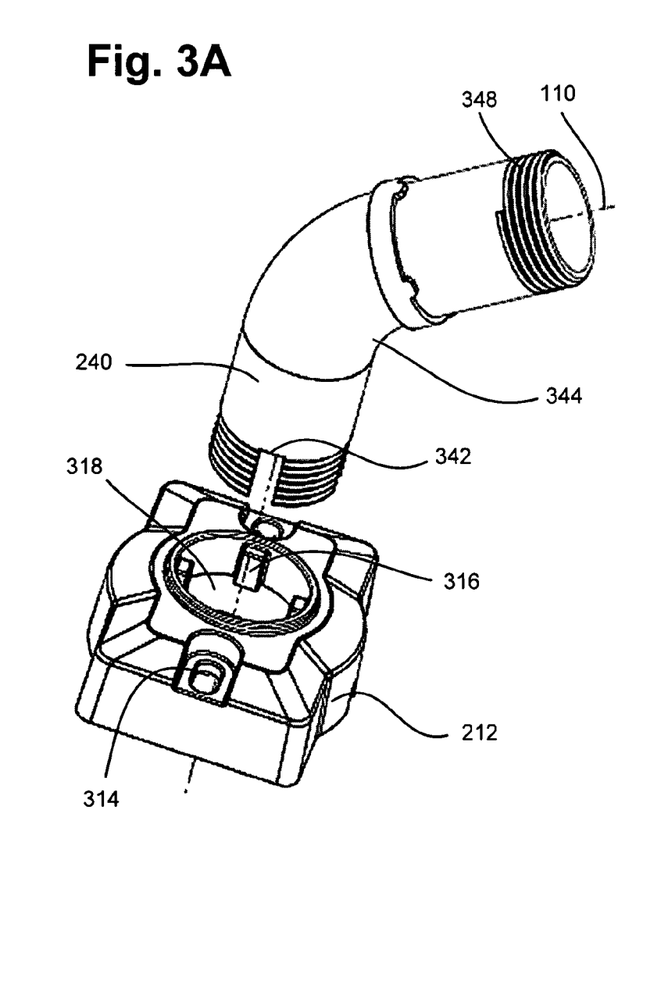
FIGS. 3A-3B illustrate the interaction between an interface assembly and an element of an adjustment assembly of the mount in accordance with an exemplary embodiment of the present invention.

FIG. 3A illustrates the interaction between the base 212 and a component of the adjustment assembly 215, specifically the extension arm 240, of the mount 100 in accordance with an exemplary embodiment of the present invention. The base 212 may provide an interface between the mount 100 and a structure to which it is connected. As shown in FIG. 3A, the base 212 may comprise screw holes 214 through which screws may be inserted to attach the mount 100 to a surface. The base 212 may further comprise one or more interface elements, such as base protrusions 316, protruding members, projecting members, knobs, or bumps, and may also comprise an aperture 318. The base protrusions may be adapted to engage complementary structures on the extension arm. The extension arm 240 is preferably hollow, and may comprise one or more interface elements, such as extension arm notches 342 or grooves, located around the end of the extension arm 240 that is directed toward the base 212. The extension arm may further comprise a bend 344, which will be explained in reference to FIG. 4, and threading 348, which will be explained in reference to FIG. 6.

The base 212 and the extension arm 240 may be rotatably connected to each other. The size and shape, and possibly the placement, of the extension arm notches 342 may correspond to the size and shape, and possibly placement, of the base protrusions 316 on the base 212. This allows the extension arm 240 to be inserted into the base 212 with at least one extension arm notch 342 set around at least one base protrusion 316. Preferably, the extension arm 240 has a plurality of extension arm notches 342, and the base 212 has a complimentary number and arrangement of base protrusions 316. In an exemplary embodiment of the mount, the extension arm notches 342 may be equally spaced apart, and likewise with the base protrusions 316. The extension arm 240 may then be set into the base 212 in any position at which the extension arm notches 342 and the base protrusions 316 align. To readjust the connection between the extension arm 240 and the base 212, the extension arm 240 may be disengaged from the base 212, rotated, and then reengaged to the base 212 at a different alignment of extension arm notches 342 and base protrusions 316. When the extension arm 240 is inserted into the base 212, the extension arm 240 and the base 212 are engaged, and the extension arm 240 is substantially fixed in some position and orientation relative to the base 212; otherwise, the pair is disengaged.

Those of skill in the art will recognize that alternative structures may be used to engage the extension arm 240 and the base 212. For example, and not limitation, the extension arm 240 may include protrusions above the threaded portion of the extension arm 240, and the base 212 may include complimentary grooves or notches.

A spring (not shown) or springs may assist the connection between the base 212 and the extension arm 240, as well as the other connections between adjacent elements of the mount 100. A spring may, for example, connect to the inside or outside of the extension arm 240 at one end of the spring, and to the base 212 at the other end of the spring. When the extension arm 240 is inserted in and engaged to the base 212 (i.e., one or more extension arm notches 342 are set over one or more base protrusions 316), the spring may be in a relaxed position. On the other hand, when the extension arm 240 is lifted from the base 212, the spring may stretch, thereby physically pressuring the two elements to return to the engaged position and causing the extension arm 240 and the base 212 to remain connected at all times. Likewise, a spring or springs may assist any or all of the connections between any set of two or more elements of the mount 100. Accordingly, the mount may be adjustable without the use of external tools.

Additionally, a device cable 110 can be threaded through the extension arm 240 and further through the aperture 318 of the base 212 to conceal the cable 110 from view and from tampering.

Figure 3B:
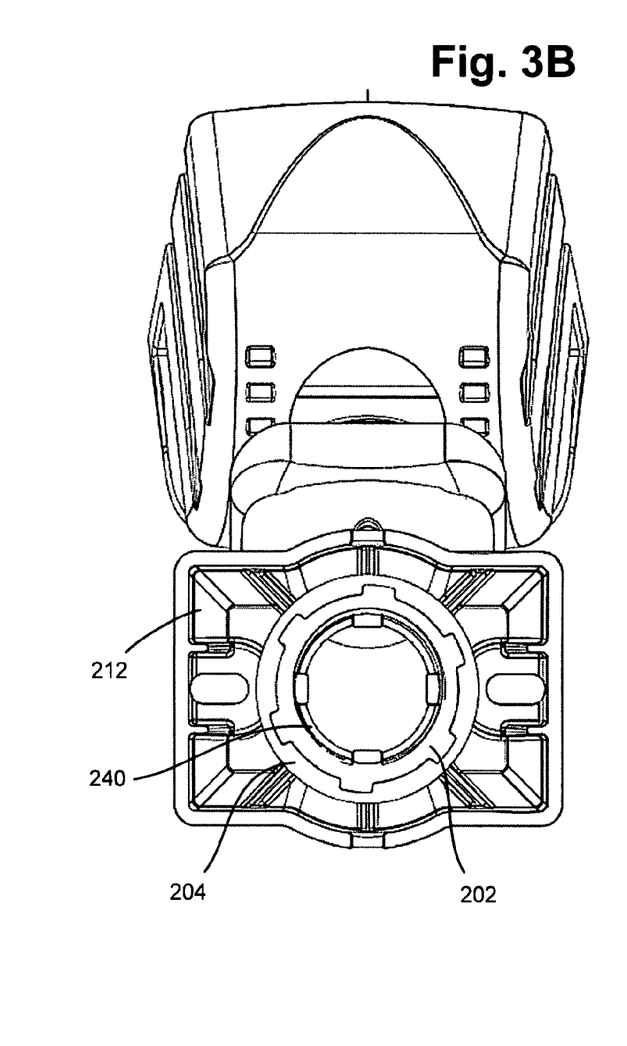

The first nut 202 and the first anchoring member 204 may secure the extension arm 240 to the base 212 as further illustrated in FIG. 3B.

FIG. 3B illustrates an underside of the mount of FIG. 1, particularly illustrating how the extension arm 240 may be secured to the base 212. When the extension arm 240 and the base 212 are in engagement with each other, they may be secured together by means of a first nut 202 and a first anchoring member 204, or washer. The first anchoring member 204 may slide over the extension arm 240, and then the first nut 202 may screw onto the end of the extension arm 240 after the first anchoring member 204. When the first nut 202 is screwed on tightly so that the first anchoring member 204 is pushed tightly against the base 212, the extension arm 240 may be secured to the base 212.

Figure 4:
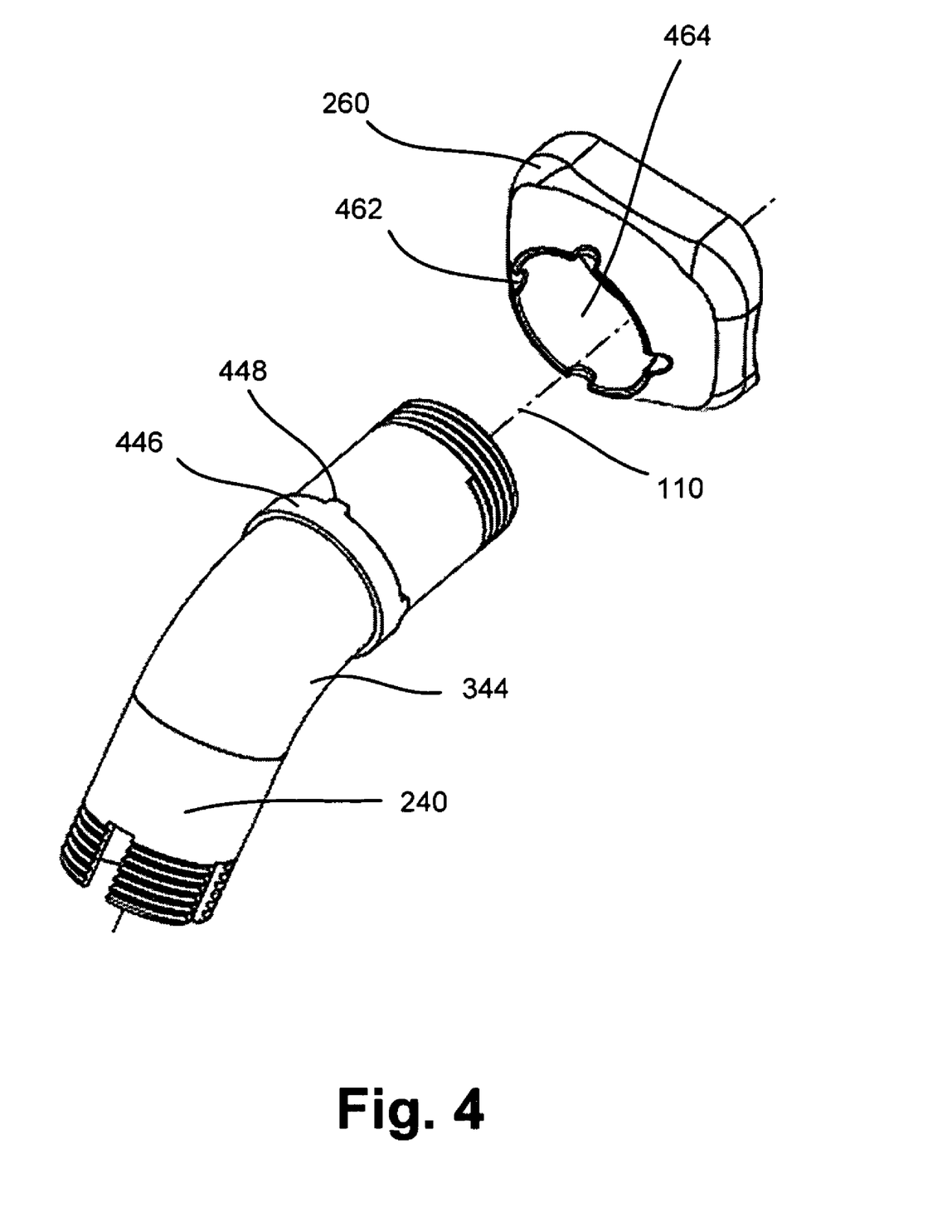
FIG. 4 illustrates the interaction between two elements of the adjustment assembly of the mount in accordance with an exemplary embodiment of the present invention.

FIG. 4 illustrates the interaction between two elements of the adjustment assembly 215, specifically the extension arm 240 and the collar member 260, in an exemplary embodiment of the mount 100. In addition to those elements of the extension arm 240 recited above, the extension arm 240 may further comprise a rotational interface band 446 with one or more interface elements, such as band protrusions 448, protruding members, projecting members, knobs, or bumps, and may also comprise a bend 344 (also see FIG. 3A). The collar member 260 may comprise one or more interface elements, such as collar member notches 462 or grooves, as well as an aperture 464.

The collar member 260 may be rotatably connected to the extension arm 240. The collar member 260 may slide over an end of the extension arm 240 until the collar member 260 reaches the rotational interface band 446. The band protrusions 448 may be located around the edge of the rotational interface band 446 that is directed toward the collar member 260. Likewise, the collar member notches 462 may be located around the edge of the collar member 260 that is directed toward the rotational interface band 446. Preferably, the rotational interface band 446 is an integral part of the extension arm 240; however, the rotational interface band 446 may be implemented as a separate, complimentary component.

The size and shape, and possibly the placement, of the collar member notches 462 may correspond to the size and shape, and possibly placement, of the band protrusions 448. This allows the collar member 260 to be set in a position and orientation relative to the extension arm 240, with at least one collar member notch 462 set around at least one band protrusion 448. Preferably, the collar member 260 has a plurality of collar member notches 462, and the rotational interface band 446 has a complimentary number of band protrusions 448. The collar member notches 462 may be equally spaced apart, and likewise with the band protrusions 448. The collar member 260 may then be set around the extension arm 240 in any position at which the collar member notches 462 and the band protrusions 448 align. To adjust the connection between the collar member 260 and the extension arm 240, the collar member 260 can be disengaged from the rotational interface band 446, rotated, and then reengaged to the rotational interface band 446 at a different alignment of collar member notches 462 and band protrusions 448. When the collar member 260 is set on the rotational interface band 446, the collar member 260 and the extension arm 240 are engaged, and the collar member 260 is substantially fixed in some position and orientation relative to the extension arm 240; otherwise, the two are disengaged. Those of skill in the art will recognize that alternative structures may be used to engage the extension arm 240 and the collar member 260.

As mentioned previously, a spring (not shown) or springs may assist the connection between the collar member 260 and the extension arm 240, physically pressuring the two elements to remain in or return to the engaged position. The use of a spring may allow adjustment without loosening either of the locking nuts 202, 228.

As seen more clearly in FIG. 3A, the extension arm 240 may further comprise a bend 344. This bend 344 allows the axis about which the collar member 260 rotates relative to the extension arm 240 to differ from the axis about which the extension arm 240 rotates relative to the base 212.

Referring back to FIG. 4, a device cable 110 can be threaded through the collar member 260 and further through the extension arm 240 to conceal the cable 110 from view and from tampering.

Figure 5A:
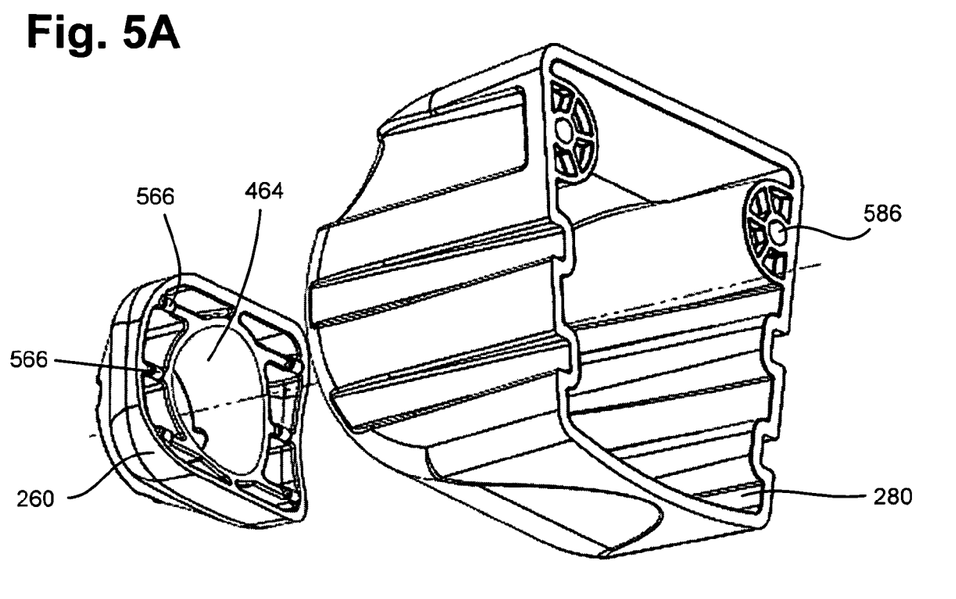
FIGS. 5A-5B illustrate different views of the interaction between two elements of the adjustment assembly of the mount in accordance with an exemplary embodiment of the present invention.
Figure 5B:
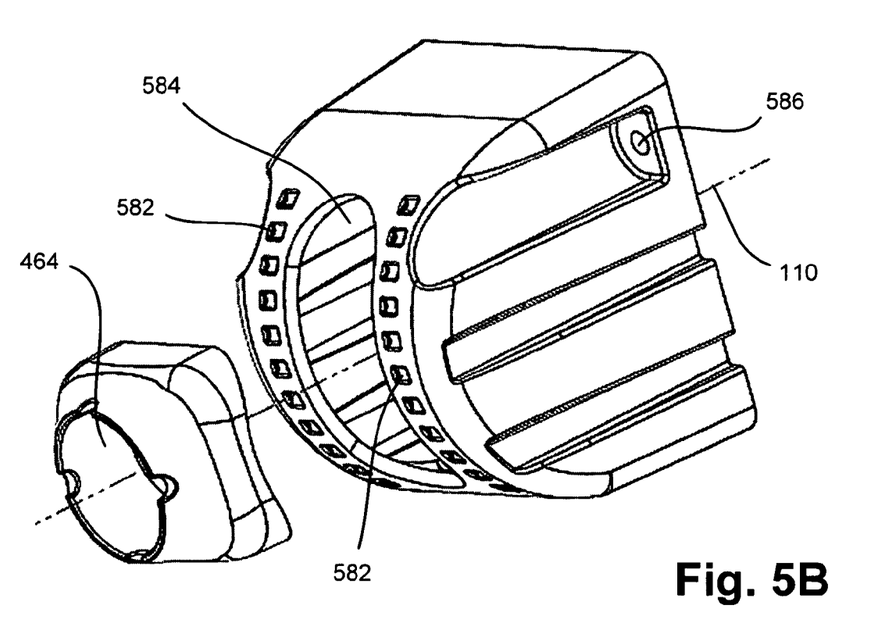

FIGS. 5A-5B illustrate different views of the interaction between two elements of the adjustment assembly 215, specifically the collar member 260 and the swivel adapter 280, in an exemplary embodiment of the mount 100. In addition to the elements of the collar member 260 recited above, the collar member 260 may further comprise a plurality of interface elements, such as protruding members, projecting members, knobs, bumps, or protrusions 566. The swivel adapter 280 may comprise holes, notches, or swivel adapter grooves 582, an aperture 584, and screw holes 586 or other attachment means.

The collar member 260 and the swivel adapter 280 may be pivotably connected. Preferably, the collar member 260 has a curved face directed toward the swivel adapter 280, which curved face compliments a curvature of the swivel adapter 280. Preferably, the swivel adapter can pivot about a single axis of rotation relative to the collar.

The size and shape of the swivel adapter grooves 582 of the swivel adapter 280 may correspond to the size and shape of the collar member protrusions 566. This allows the swivel adapter 280 to be set in a position and orientation relative to the collar member 260, with at least one collar member protrusion 566 set into at least one swivel adapter groove 582. Preferably, the collar member 260 has a plurality of collar member protrusions 566, and the swivel adapter 280 has a plurality of swivel adapter grooves 582. As the swivel adapter 280 pivots, the portion of the swivel adapter 280 that contacts the collar member 260 shifts, bringing an additional portion or portions of the swivel adapter 280 in contact with the collar member 260. As such, a greater surface area of the swivel adapter 280 may be capable of coming into contact with the collar member 260, as compared to a lesser surface area of the collar member 260 that may be capable of coming into contact with the swivel adapter 280. As a result, it would be beneficial for the swivel adapter grooves 582 to outnumber the collar member protrusions 566 so as to space the swivel adapter grooves 582 throughout the length of the portion of the swivel adapter 280 capable of contacting the collar member 260. Further, it would be preferable for the swivel adapter grooves 582 to be arranged in rows on the swivel adapter 280, and for collar member protrusions 566 to, likewise, be arranged in rows. Further, the number of rows of collar member protrusions 566 may be equivalent to the number of rows of swivel adapter grooves 582, and the placement of the collar member protrusions 566 may correspond with the placement of the swivel adapter grooves 582, as is the case in the exemplary embodiment depicted in FIG. 5A and FIG. 5B. The swivel adapter grooves 582 may be spaced apart at equal intervals so that the distance between any two adjacent swivel adapter grooves 582 is substantially equivalent.

The swivel adapter 280 may be in engagement with the collar member 260 in any position at which the collar member protrusions 566 and the swivel adapter grooves 582 align. The swivel adapter 280 may be lifted away from the collar member 260, pivoted or shifted, and then reset against the collar member 260 at a different alignment of collar member protrusions 566 and swivel adapter swivel adapter grooves 582. When the swivel adapter 280 is set against the collar member 260, the swivel adapter 280 and the collar member 260 are engaged, and the swivel adapter 280 is substantially fixed in some position and orientation relative to the collar member 260; otherwise, the two are disengaged. Those of skill in the art will recognize that alternative structures may be used to engage the swivel adapter 280 and the collar member 260.

As mentioned previously, a spring (not shown) may assist the connection between the swivel adapter 280 and the collar member 260, physically pressuring the two elements to remain in or return to the engaged position. The use of a spring may allow adjustment without loosening either of the locking nuts 202, 228.

In an exemplary embodiment of the present invention, the swivel adapter 280 is adapted to connect to the device to be mounted. While the swivel adapter 280 may directly contact the device, the swivel adapter 280 may alternatively directly contact some other element, which is connected to the device. Either way, the swivel adapter 280 may carry the device, and may adapt the device to operate with the mount 100. The screw holes 586 of the swivel adapter 280 may allow the swivel adapter 280 to be directly attached to the device or to an element or object that is somehow connected to the device.

The extension arm 240 (not shown in FIG. 5A or FIG. 5B), which may extend through the collar member 260, as discussed above, may also extend through the aperture 584 of the swivel adapter 280. Preferably, the aperture 584 of the swivel adapter 280 has an elongated shape, thereby allowing the extension arm 240 to remain inserted through the aperture 584 as the swivel adapter 280 pivots in relation to the collar member 260. A cable 110 of the device carried by the swivel adapter 280 can be threaded through the swivel adapter 280 and further through the collar member 260 to conceal the cable 110 from view and from tampering.

Figure 6:
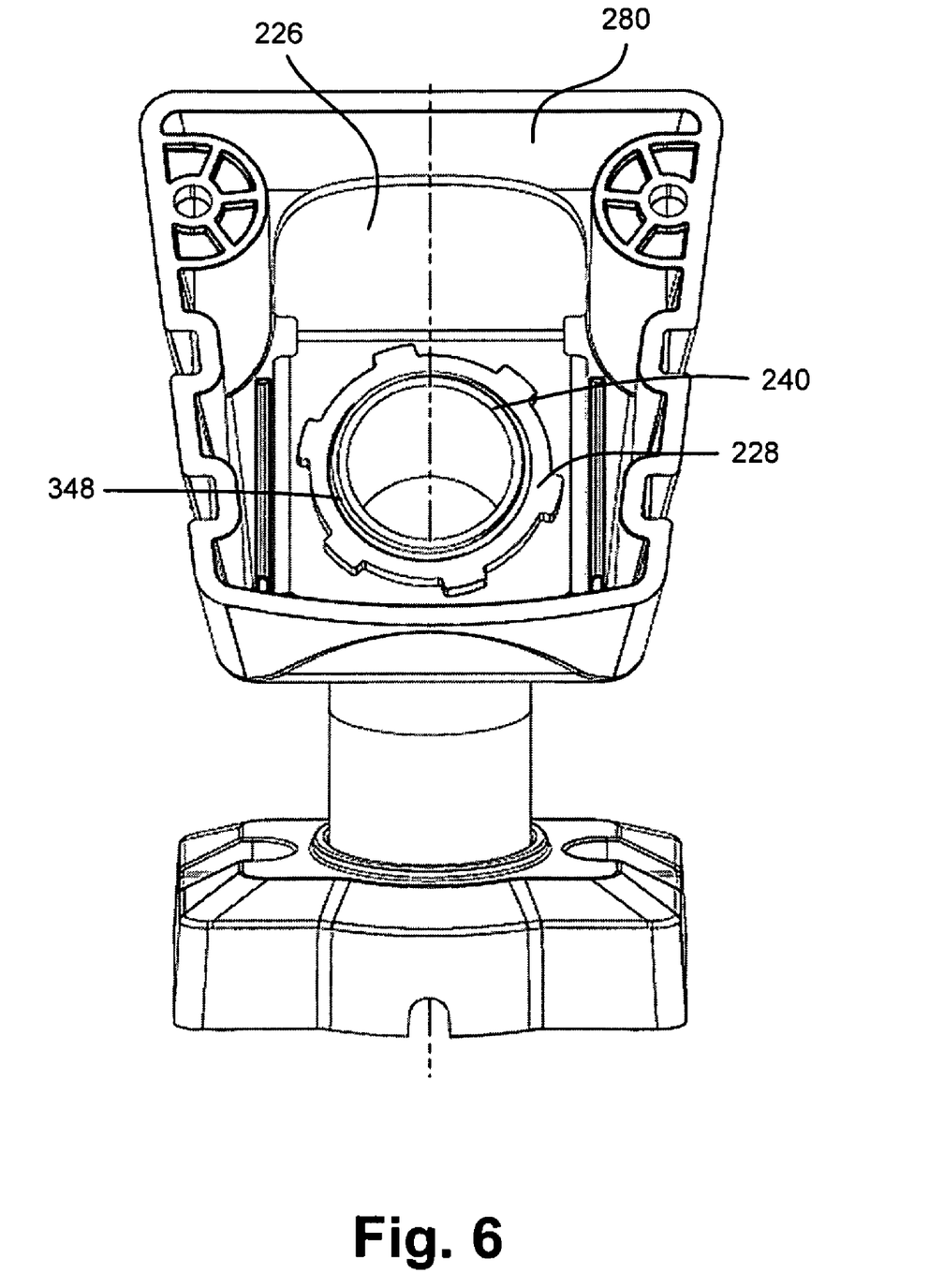
FIG. 6 illustrates a front perspective view of the mount in accordance with an exemplary embodiment of the present invention.

FIG. 6 illustrates a front perspective view of the mount 100 of FIG. 1, particularly illustrating the locking mechanism 220. The locking mechanism 220 may be engageable to lock the elements of the adjustment assembly 215 into place, thereby restricting their movement relative to one another. When the locking mechanism 220 is engaged, no elements of the adjustment assembly 215 may be disengaged or readjusted. Alternatively, the locking mechanism 220 may lock only certain elements of the adjustment assembly 215. For example, the locking mechanism 220 may lock the extension arm 240 into the base 212, and the collar member 260 around the extension arm 240, while leaving unrestricted the connection between the swivel adapter 280 and the collar member 260. This would allow the operator to adjust the angle of the swivel adaptor 280 in relation to the collar member 260; the operator would still have one degree of freedom through which to adjust the device mount 100 without having to disengage the locking mechanism 220.

As mentioned previously, the locking mechanism 220 may comprise a second anchoring member 226 and a second nut 228. The locking mechanism 220, however, need not include any nuts or anchoring members, but may comprise, for example, a clamping mechanism. In the exemplary embodiment depicted in FIG. 6, the locking mechanism 220 comprises elements located inside the swivel adapter 280, but this need not be the case. Elements of the locking mechanism 220 may be located at any location on the mount 100, and may even be interspersed throughout the parts of the mount 100.

The second anchoring member 226 and the second nut 228 may be placed over an end of the extension arm 240, which may extend from the swivel adapter 280. The second anchoring member 226 and the second nut 228 may tighten onto the upper end of the extension arm 240. The end of the extension arm 240 may comprise threading 348 (also see FIG. 3A) to enable the second nut 228 to be secured to the extension arm 250. Because the end of the extension arm 240 may extend through the collar member 260 and through the swivel adapter 280, this tightening may maintain the swivel adapter 280 engaged to the collar member 260, and the collar member 260 engaged to the extension arm 240.

In the exemplary embodiment depicted, the second nut 228 needs to be loosened or unscrewed to allow elements of the adjustment assembly 215 to disengage and move in relation to one another, but this need not be the case. For example, a spring (not shown) may be placed over the extension arm 240 such that the cylinder shape of the spring encloses the cylinder shape of a portion of the extension arm 240. The spring may be located between the second anchoring member 226 and the second nut 228, so that the second nut 228 secures the spring over the extension arm 240.

Preferably, the spring may be secured on the extension arm 240 a in a partially compressed state. In such a state, the spring is capable of being further compressed, yet it exerts force on the second anchoring member 226, which force pressures the elements of the adjustment assembly 215 to remain pressed together and, therefore, engaged. When the spring is in such a state, the locking mechanism 220 is engaged, and elements of the adjustment assembly 215 are restricted in their movement. Given this configuration, the locking mechanism 220 may be disengaged when a user pulls the swivel adapter 280 away from the collar member 260. This causes the spring to further compress, and reduces the force exerted on the adjustment assembly 215 by the spring, allowing elements of the adjustment assembly 215 to disengage and move relative to one another. Releasing the swivel adapter 280 may cause the spring to return to its original, partially compressed state, pressuring elements of the adjustment assembly 215 to remain engaged once again. Alternatively, the wings 227 of the second anchoring member 226 may be resilient such that they may flex and serve the purpose of the spring.

Figure 7A:
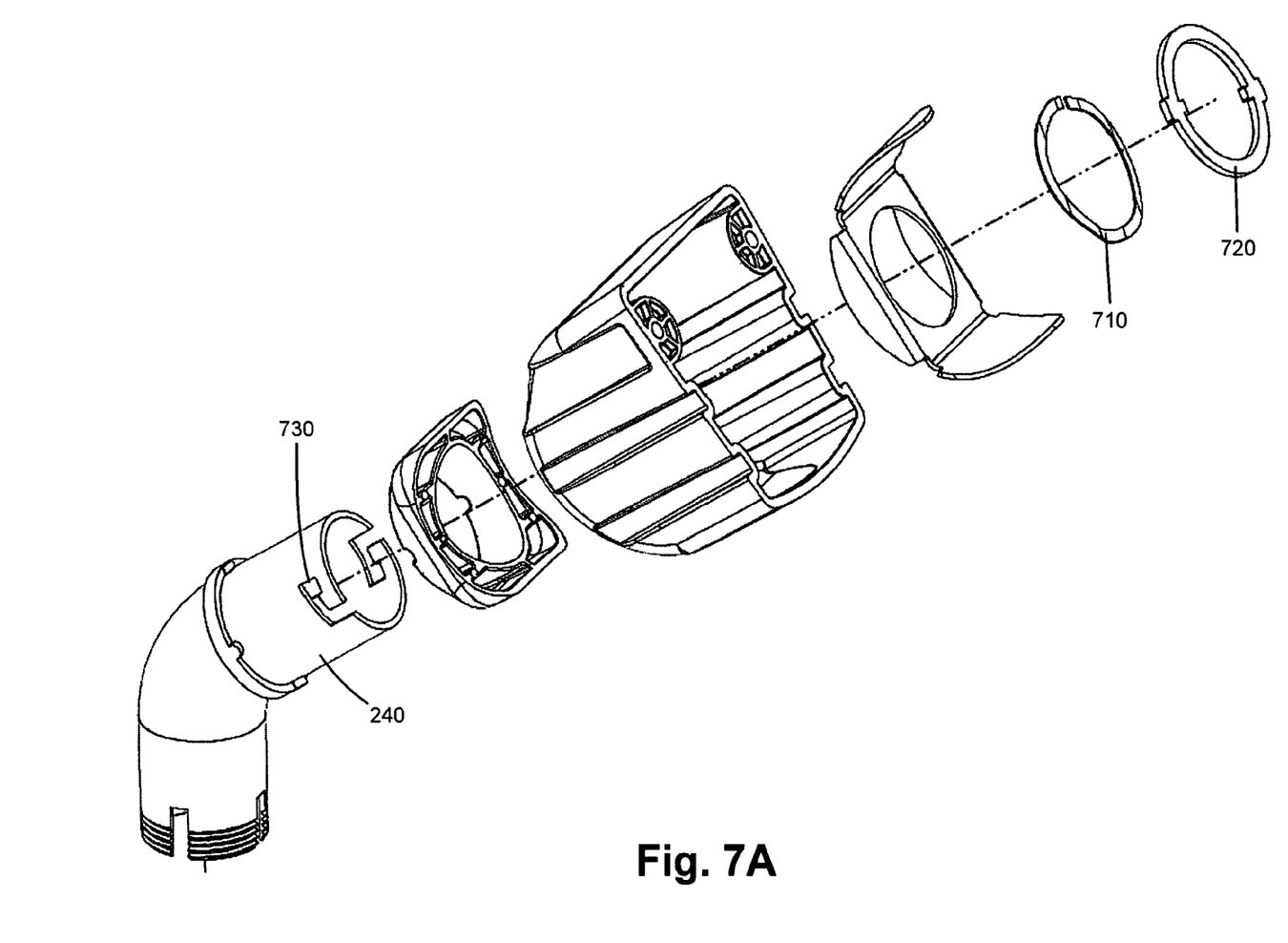
FIG. 7A illustrates an exploded perspective view of a portion of the mount in accordance with an exemplary embodiment of the present invention.
Figure 7B:
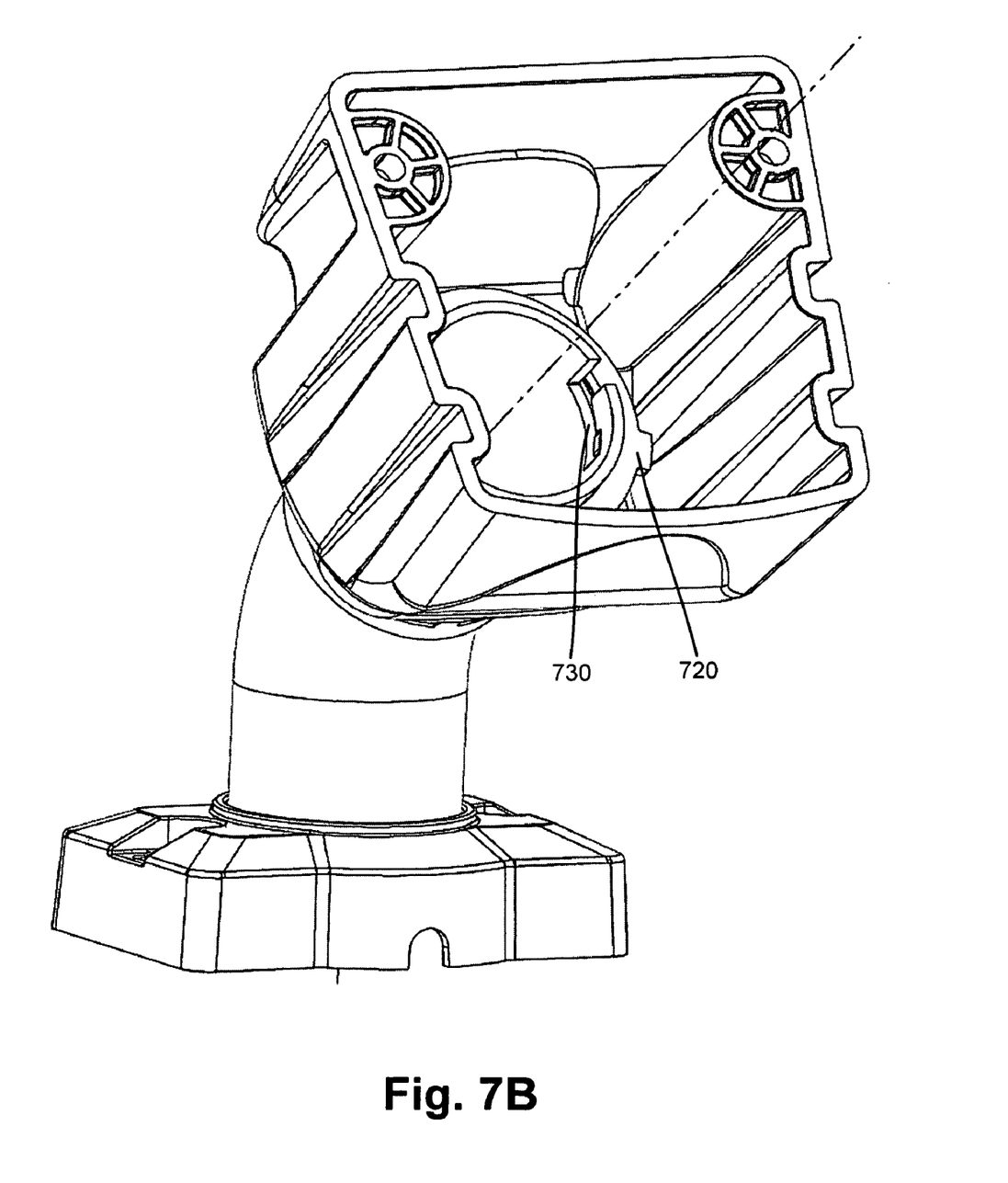
FIG. 7B illustrates an angled perspective view of the mount in accordance with an exemplary embodiment of the present invention.

FIGS. 7A-7B illustrate an alternate exemplary embodiment of the locking mechanism 220. FIG. 7A illustrates the alternate locking mechanism 220 in an exploded view, and FIG. 7B illustrates the alternate locking mechanism 220 in a collapsed view. As shown in FIGS. 7A-7B, in this exemplary embodiment, the locking mechanism may comprise a wave spring 710 and a retaining ring 720. Additionally, in this exemplary embodiment, the extension arm 240 may comprise one or more receiving members 730.

The wave spring 710 and the retaining ring 720, which may be a bayonet-type retaining ring, may be placed over an end of the extension arm 240, which may extend from the swivel adapter 280. One or more portions of the retaining ring 720 may be inserted into the receiving members 730 of the extension arm 240. The retaining ring 720 may then be rotated, such that the inserted portions of the retaining ring 720 are secured in the receiving members 730. When the retaining ring 720 is secured, the wave spring 710 may be in a relaxed or partially compressed state.

As with the other exemplary embodiment, the locking mechanism 220 may be disengaged when a user pulls the swivel adapter 280 away from the collar member 260. This causes the wave spring 710 to further compress, and reduces the force exerted on the adjustment assembly 215 by the wave spring 710, thereby allowing elements of the adjustment assembly 215 to disengage and move relative to one another. Releasing the swivel adapter 280 may cause the wave spring 710 to return to a relaxed or partially compressed state, thereby pressuring elements of the adjustment assembly 215 to remain engaged once again.

While the invention has been disclosed in its preferred forms, it will be apparent to those skilled in the art that many modifications, additions, and deletions can be made therein without departing from the spirit and scope of the invention and its equivalents, as set forth in the following claims.

What is claimed is:

1. A mounting apparatus for mounting a device, the mounting apparatus comprising:
a base securable to a surface;
a first intermediate component engageable to the base at two or more predetermined positions relative to the base;
a second intermediate component, comprising a first protrusion, and engageable to the first intermediate component at two or more predetermined positions relative to the first intermediate component; and
an adapter for carrying the device, comprising a plurality of notches, the adapter engageable to the second intermediate component at two or more predetermined positions relative to the second intermediate component;
wherein the first intermediate component, the second intermediate component, and the adapter are adjustable to position the device at a plurality of predetermined positions relative to the base;
wherein the first protrusion is configured to engage one of the plurality of notches to maintain the position of the adapter relative to the second intermediate component;
wherein the first intermediate component comprises an extension arm;
wherein the second intermediate component comprises a collar member, comprising a first end and a second end and having a first notch disposed on the second end, wherein the first end of collar member is engageable with the extension arm;
wherein each of the first intermediate component, the second intermediate component, and the adapter is adapted to receive a wire; and
wherein the extension arm further comprises a rotational interface band with band protrusions, the collar member having collar member notches complementary to the band protrusions, wherein the band protrusions and the collar member notches are engageable to fix the collar member in a position relative to the extension arm.

2. The mounting apparatus of claim 1, wherein the first intermediate component, the second intermediate component, and the adapter are adjustable without use of an external tool.

3. The mounting apparatus of claim 1, further comprising a locking mechanism for securing the first intermediate component, the second intermediate component, and the adapter, wherein engagement of the locking mechanism restricts the movement of the first intermediate component, the second intermediate component, and the adapter relative to one another.

4. The mounting apparatus of claim 1, wherein the collar member is adapted to rotate and to be fixed in a plurality of predetermined positions relative to the extension arm.

5. The mounting apparatus of claim 1, wherein the adapter is adapted to pivot about a single axis of rotation, and to be fixed in a plurality of predetermined positions relative to the collar member.

6. The mounting apparatus of claim 1, the collar member having collar member protrusions, the adapter having adapter grooves complementary to the collar member protrusions, wherein the collar member protrusions and the adapter grooves are engageable to fix the adapter in a position relative to the collar member.

7. The mounting apparatus of claim 1, the base comprising a set of base interface elements, and the extension arm further comprising a second plurality of extension arm interface elements, wherein one or more of the second plurality of extension arm interface elements is engageable to one or more of the plurality of base interface elements.

8. A mounting apparatus for a device, the mounting apparatus comprising:
- an extension arm having a first end, a second end, and an extension arm aperture extending from the first end to the second end adapted to receive a wire;
- a collar member, comprising at least a first protrusion, and engageable to the first end of the extension arm in a plurality of predetermined positions, the collar member having an aperture adapted to receive the wire;
- a swivel adapter comprising a plurality of notches engageable to at least the first protrusion on the collar member in a plurality of predetermined positions, the swivel adapter having an aperture adapted to receive the wire; and
- a locking mechanism, which, when engaged, prohibits the collar member from moving relative to the extension arm, and restricts the swivel adapter from moving relative to the collar member;

wherein the plurality of predetermined positions at which the collar member can be engaged relative to the extension arm are rotationally disposed from one another; and wherein the plurality of predetermined positions at which the collar member can be engaged relative to the extension arm are rotationally disposed from one another.

9. The mounting apparatus of claim 8, further comprising:
- a base for connecting to a surface, the base having an aperture adapted to receive a wire;

wherein the second end of the extension arm is engageable to the base at a plurality of predetermined positions.

10. The mounting apparatus of claim 8, wherein the plurality of predetermined positions at which the swivel adapter can be engaged relative to the collar member are rotationally disposed from one another.

11. The mounting apparatus of claim 8, wherein the extension arm comprises a bend such that the axis of rotation of the collar member relative to the extension arm differs from the axis of rotation of the extension arm relative to the interface assembly.

* * * * *